April 11, 1967        E. S. WRIGHT ETAL        3,313,021
EXPLOSIVE BUTT WELDING
Filed March 2, 1964

INVENTORS
EDWARD S. WRIGHT
ARTHUR E. BAYCE
BY Samuel Lindenberg
ATTORNEY

3,313,021
EXPLOSIVE BUTT WELDING
Edward S. Wright, Los Altos, and Arthur E. Bayce, Menlo Park, Calif., assignors to Stanford Research Institute, Menlo Park, Calif., a corporation of California
Filed Mar. 2, 1964, Ser. No. 348,463
5 Claims. (Cl. 29—484)

This invention relates to explosive welding of metals and more particularly, to a novel method and means of explosive butt welding.

An object of this invention is to provide a novel method and means for explosively butt welding two metals together.

Yet another object of the present invention is to provide a useful method and means for butt welding two metals.

Still another object of the present invention is to provide a simple method and means for effectuating the butt welding of two metals.

These and other objects of the present invention may be achieved by placing the two metals which it is desired to butt weld adjacent one another on a suitable anvil. Thereafter, a shock wave pulse, which may be explosively generated, is applied to the plate surfaces. A compressive wave is thus initiated in the two metal plates which results in lateral expansion and impact of the two adjacent plate edges in such a way that a strong metallurgical bond between the two plates at the abutting edges is achieved. The amplitude of the shock wave must be such that the resulting contact of the abutting edges of the two plates must be at a velocity sufficiently great that the impact pressure is well above the yield strength of the two materials. It is further desirable that the point, or line, of impact must move across the surfaces to be joined at less than the velocity of sound in the two materials.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
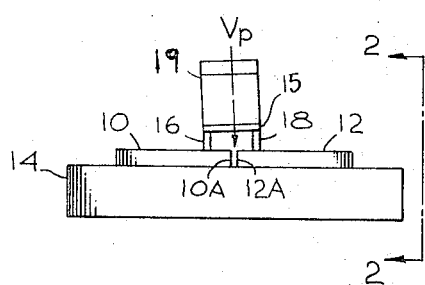
FIGURE 1 is an end view of an arrangement for butt welding using a flying plate technique in accordance with this invention.
Figure 2:
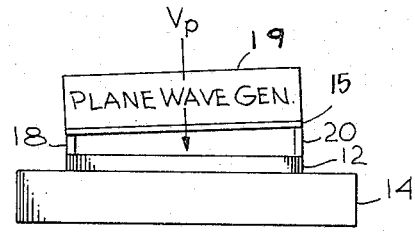
FIGURE 2 is a side view of FIGURE 1.

Referring now to FIGURE 1 and FIGURE 2 which are respectively end and side views of an arrangement for producing butt welding in accordance with this invention, there are shown two metal plates respectively 10, 12, which are placed on an anvil 14. The ends respectively 10A, 12A, which it is desired to butt weld together, are placed adjacent one another. These ends may, but preferably, do not touch, since, as will become apparent from the subsequent discussions, the two adjacent plates under the effect of the shock wave to be applied undergo a lateral plastic deformation, and some minimum spacing should be provided to allow this to begin before the occurrence of an impact. Also, the distance between the abutting edges should be less than the extent of this lateral deformation.

A shock wave is applied, by any suitable mechanism, to the regions of the two plates on either side of the edges at which it is desired butt welding to occur. As shown in the drawings, the mechanism for applying the shock waves comprises a flying plate 15 which is supported above the two plates by plastic supports respectively 16, 18, and 20. These collapse when a flying plate 15 is driven. The flying plate is driven by means of an arrangement known as a plane wave generator 19. Plane wave generators are well known in the explosive art and there are many different arrangements thereof. One suitable arrangement is shown and described in connection with FIGURE 5 below.

It should be further noted that the flying plate is not necessarily exactly parallel with the two plates to be butt welded, but may make some small angle therewith. This is accomplished by making the plastic supports of irregular length.

It has been found that the shock wave, which is applied to the two plates to be welded, results in a lateral expansion and impact of the two adjacent plate edges 10A, 12A in such a way that a strong metallurgical bond between the two plates is achieved. It has further been found that the two plates to be joined must impact each other with a velocity sufficiently great that the impact pressure is well above the yield strength of the two materials. Further, as previously indicated, the point, or line, of impact must move across the surface at less than the velocity of sound in the two materials. Since, in the case of butt welding, the impact of two surfaces to be joined results from lateral expansion of the plates caused by a plastic wave passing through the plates in the thickness direction, assuming approximate hydrodynamic behavior, the lateral impact pressure is comparable to, but less than, the peak pressure of the perpendicular shock wave. Since shock waves of moderate amplitude travel at velocities less than the sonic or elastic wave velocity, the collision point velocity is automatically sub-sonic, thus satisfying one of the criteria for welding. It follows, therefore, that the primary requirement for explosive butt welding is that the pressure of the applied shock wave be well above the dynamic yield strength of the materials to be joined. Best results may be obtained by employing a peak pressure on the order of ten times the static yield strength. Static yield strengths range from 4,000 to 400,000 pounds per square inch for most metals and alloys.

Figure 3:
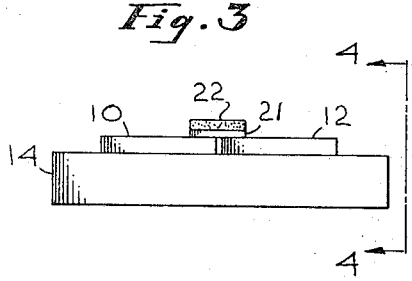
FIGURE 3 is an end view of a contact explosive technique being used for butt welding in accordance with this invention.
Figure 4:
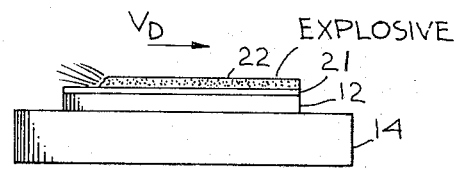
FIGURE 4 is a side view of FIGURE 3.

While FIGURES 1 and 2 exemplify the use of a flying plate for the purpose of butt welding, FIGURES 3 and 4, respectively, show an end view and a side view of an arrangement for using contact explosives for effectuating butt welding. As before, an anvil 14 is employed upon which there is placed the plates respectively 10, 12 with their edges which it is desired to butt weld together adjacent to one another. A thin cover plate 21, which by way of example, may be made of aluminum, is placed over the edges desired to be butt welded. The explosive pad 22 is placed on top of the cover plate. The explosive is ignited at one end as shown in FIGURE 4 and as it traverses from one end to the other of the two plates, it produces the required shock wave which results in the line of impact moving across the adjacent surfaces of the two materials at less than the velocity of sound of these two materials.

Figure 5:
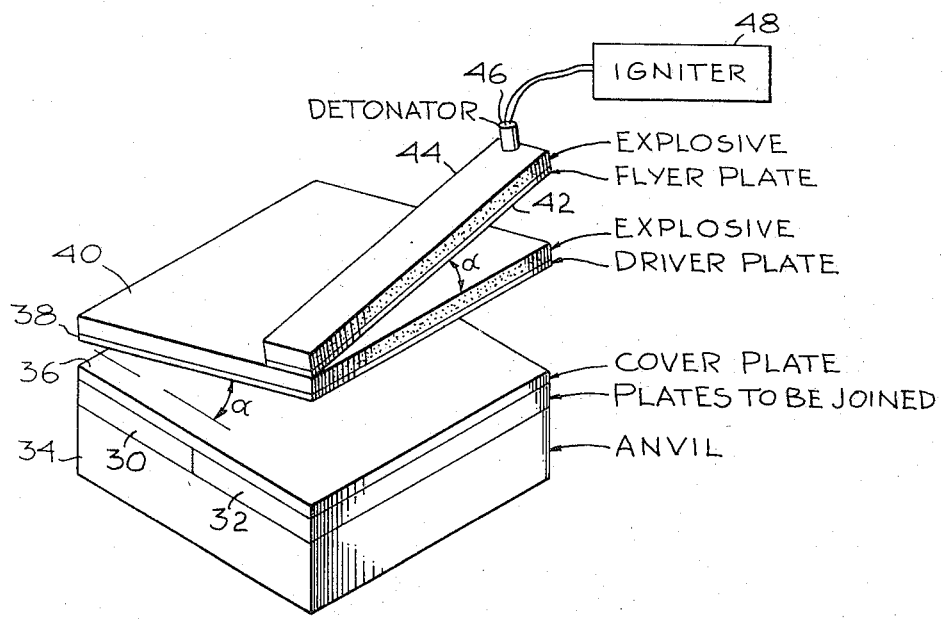
FIGURE 5 is a perspective view illustrating a type of plane wave generator and arrangement of material to be butt welded in accordance with this invention.

FIGURE 5 is an isometric view showing a butt welding arrangement, in accordance with this invention, employing a "mouse trap" plane wave generator. The two plates to be joined respectively 30, 32 are placed on an anvil 34. The surfaces to be joined abut one another. A cover plate 36 is placed over the two plates to be joined. By way of example of an illustrative butt weld, the plates to be joined were made of aluminum, as was also the anvil. The cover plate was made of $\frac{1}{16}$ inch aluminum.

A driver plate 38 is placed at an angle $\alpha$ with respect to the cover plate 36. The driver plate was also made of $\frac{1}{16}$ inch thick aluminum. A pad of explosive 40 which, in an operative embodiment of the invention, was .204 inch thick and was of the type known as EL506D, made by the Du Pont Company, is placed over the driver plate. At the end of the explosive which is furthest away from the cover plate, there was placed a flyer plate 42 which also makes an angle α with the explosive pad 40. This flyer plate is also 1/16 inch thick aluminum. The top of the flyer plate is covered by an explosive 44 which is the same as the explosive 40 covering the driver plate. A detonator 46 is placed at the highest end of the explosive 44. The detonator is connected to an ignitor 48.

Upon ignition of the detonator, the explosive 44 is ignited and drives the flyer plate toward the explosive 40. The angle α is selected such that the time required for the upper end of the plate 42 to reach the explosive 40 is essentially the same as that required for the explosive 44 to burn down to the lower end of the plate. Effectively, this creates a line contact of flyer plate and explosive 40 whereby the explosive 40 is ignited across a line. As the line travels down the explosive 40, the driver plate 38 is driven in a manner such that the plate will effectively contact the cover plate over its entire area. It was found that the impact pressure, with the arrangement shown, is on the order of 182 kilobars. As previously indicated, the peak pressure of the shock wave was well above the dynamic yield strength of the material and peak pressures in the range or on the order of ten times static strength is a suggested minimum.

There has accordingly been shown and described herein a novel, useful method and means for butt welding metals, with explosive techniques.

In the claims:

1. A method of butt welding two metal plates together comprising placing the two metal plates on an anvil with the ends to be butt welded adjacent, but not abutting one another;
    positioning a driver plate over the region of the adjacent edges to be joined;
    providing sufficient explosive on said driver plate to provide, on ignition, a lateral deformation in said adjacent plates exceeding the distance therebetween, to cause said plates to impact with a velocity sufficiently great that the impact pressure is well above the yield strength of said plates, said explosives being selected to cause the impact front to move at a velocity less than the velocity of sound in either of said two plates; and
    igniting said explosives to generate a shock pressure wave to drive said driver plate against the surface of both of said plates to thereby cause said driver plate to apply a shock pressure wave to the surfaces of both said plates normal to said adjacent ends to provide said lateral deformation and said impact front velocity in said two metal plates.

2. The method as recited in claim 1 wherein the amplitude of the pressure applied by said shock wave is on the order of ten times the yield strength of the materials being welded.

3. A method of butt welding two metal plates together comprising placing the two metal plates on an anvil with the ends to be butt welded adjacent but not abutting one another;
    positioning a driver plate over the region of the adjacent edges to be joined so that said driver plate impacts said adjacent plates at a velocity less than the sonic velocity of sound in said plates upon detonation of an explosive thereon;
    providing sufficient explosive on said driver plate to provide, on ignition, a lateral deformation in said adjacent plates exceeding the distance therebetween, to cause said plates to impact with a velocity sufficiently great that the impact pressure is well above the yield strength of said plates;
    detonating said explosive on said driver plate to drive said driver plate against the surfaces of both of said plates to move the impact front of said adjacent ends at a velocity less than the velocity of sound in either of said plates.

4. The method as recited in claim 3 wherein:
    the explosive on said driver plate, which is positioned over said adjacent edges is detonated from one end of the adjacent ends to said two plates to cause progression of said detonation from said one end of said two plates to the other.

5. The method as recited in claim 3 wherein said driver plate is positioned over the region of the adjacent edges to make an acute angle with the surfaces of said two plates normal to the adjacent edges.

References Cited by the Examiner

UNITED STATES PATENTS 3,197,855   8/1965   Carter et al. _____ 29—470.1
3,197,856   8/1965   Polhemus et al.

JOHN F. CAMPBELL, *Primary Examiner.*

P. M. COHEN, *Assistant Examiner.*